US011029932B2

(12) United States Patent
Naravanekar et al.

(10) Patent No.: US 11,029,932 B2
(45) Date of Patent: Jun. 8, 2021

(54) HYDRATION OF APPLICATIONS

(71) Applicant: MICROSOFT TECHNOLOGY LICENSING, LLC, Redmond, WA (US)

(72) Inventors: Aniket Krishnat Naravanekar, Sammamish, WA (US); Yanran Hao, Redmond, WA (US); Neal Robert Christiansen, Bellevue, WA (US); Ping Xie, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/672,223

(22) Filed: Nov. 1, 2019

(65) Prior Publication Data

US 2021/0055922 A1 Feb. 25, 2021

Related U.S. Application Data

(60) Provisional application No. 62/891,209, filed on Aug. 23, 2019.

(51) Int. Cl.
*G06F 8/61* (2018.01)
*G06F 3/06* (2006.01)
*G06F 9/445* (2018.01)

(52) U.S. Cl.
CPC .............. *G06F 8/61* (2013.01); *G06F 3/0604* (2013.01); *G06F 3/0659* (2013.01); *G06F 3/0673* (2013.01); *G06F 9/445* (2013.01)

(58) Field of Classification Search
USPC ....................................................... 717/175
See application file for complete search history.

(56) References Cited

U.S. PATENT DOCUMENTS

| | | | |
|---|---|---|---|
| 6,523,166 B1* | 2/2003 | Mishra | G06F 8/61 |
| | | | 707/999.104 |
| 8,782,053 B2* | 7/2014 | Raanan | G06F 16/24542 |
| | | | 707/741 |
| 2009/0293054 A1 | 11/2009 | Sheehan et al. | |
| 2013/0311986 A1 | 11/2013 | Arrouye et al. | |
| 2017/0161050 A1* | 6/2017 | Raanan | A63F 13/355 |
| 2019/0286613 A1* | 9/2019 | Bramante | G06F 16/00 |

OTHER PUBLICATIONS

Ed Bott; "New Files On-Demand feature brings OneDrive placeholders back to Windows 10"; ZDNet.com website [full url in ref.]; May 11, 2017 (Year: 2017).*
"International Search Report and Written Opinion Issued in PCT Application No. PCT/US20/037343", dated Oct. 1, 2020, 12 Pages.
"International Search Report and Written Opinion Issued in PCT Application No. PCT/US20/037341", dated Sep. 23, 2020, 12 Pages.

* cited by examiner

*Primary Examiner* — Wei Y Zhen
*Assistant Examiner* — Clint Thatcher
(74) *Attorney, Agent, or Firm* — Newport IP, LLC; Han Gim

(57) ABSTRACT

Techniques are disclosed for managing applications. Responsive to receiving a request for access to a first application, metadata is retrieved that is written to the local drive of the computing device. Responsive to the metadata indicating that the first application is not written to the local drive of the computing device, a download request is transmitted to an application provider. A download package for application is received that includes one or more application files that are operable to execute the application when stored on the computing device without executing an installation process.

20 Claims, 10 Drawing Sheets

HYDRATION OF APPLICATIONS

PRIORITY APPLICATION

This application is a continuation of and claims priority to U.S. patent application Ser. No. 15/184,086, now U.S. Pat. No. 10,506,048, entitled "AUTOMATIC REPORT RATE OPTIMIZATION FOR SENSOR APPLICATIONS" and filed Jun. 16, 2016, which claims benefit under 35 U. S.C. § 119(e) of U.S. Provisional U.S. Patent Application No. 62/307,244, filed Mar. 11, 2016, the contents of which are incorporated herein by reference in their entirety.

BACKGROUND

Computing devices are often configured with applications and software components that far exceed those that are routinely used. Locally storing all of the files that are needed to implement both routinely and seldom used applications consumes a substantial amount of storage space. This is particularly troublesome in computing devices having low storage capacity.

Some techniques may reduce an overall software footprint on a computing device by removing seldom used application files. Such techniques enable users to manually select applications for uninstalling to free up storage space. However, when the application is needed in the future, the application must be reinstalled.

It is with respect to these and other considerations that the disclosure made herein is presented.

SUMMARY

Regardless of how seldom a user needs to use an application, the application must be installed, even if it is to be used only one time. Users typically install applications that are only used for a short period of time, yet most users do not uninstall these applications after use. Additionally, these applications take up storage space on the device. When the applications are installed on computing instances in a virtualized environment, the user may have increased costs when the user is charged based on the amount of storage capacity that is used. In such scenarios, the options for a user are:

1. Install—use application—uninstall when not needed
2. Install—use application—leave the application installed, takes up storage space
3. Install—use application—uninstall when not needed—initiate reinstall procedure when needed again—download installer—install again and repeat Various embodiments are disclosed for installing applications in a "placeholder" format. In one embodiment, when an application is installed, instead of the entire set of files being installed, one or more placeholders are created instead. The placeholder contains the metadata (file names, sizes, time stamps, permissions, version, etc.) but not the contents. The size of this placeholder may be small compared to the original file. When the user needs to launch an application, the file is retrieved from a remote location where the file was previously uploaded—either by the author of the application, by an enterprise administrator, or other service provider.

By automating a device's application storage in the manner described, users may have the freedom to install multiple applications without having to worry about the storage requirements. Additionally, enterprise administrators can provide a superset of every application that may be needed by enterprise users in a seamless manner, where applications that are not locally present can be provided on-demand without having to go through installation procedures.

In some embodiments, when the storage device is full or a predetermined condition is met (age of the installation, for example), the installed application's files may be converted to being a "placeholder". In this manner, more recently used applications may be physically installed on the user's device and old/stale applications may be converted to placeholders. An uninstallation process is not needed to convert an application to placeholders. Since the application is not functionally uninstalled, the application appears to the user as if it is fully and physically present on the device. If the user needs to launch an application that has been replaced with placeholders, the application may be launched without the need for reinstallation. In scenarios such as gaming consoles where the size of a game application is significant, the user may nevertheless be able to install a large number of games on a limited capacity console.

In some embodiments, a web-based service may be provided that allows upload of assets necessary for an application, including code binaries. In one embodiment, an operating system (OS) component may be implemented that intercepts application launches and monitors dependencies while retrieving them from the web service when needed.

The technologies described herein enable a computing device to save storage space by foregoing writing the files needed for applications to local storage and automatically downloading the files as the applications are called upon. In an example embodiment, a computing device may be initially configured with some applications in a hydrated state and other applications in a dehydrated state. In the event that a dehydrated application is invoked, the computing device may automatically download and locally store the files that are associated with the application.

Due to the existence of the placeholder files, the application (i.e., an application for which placeholders are locally stored rather than the actual application files) may appear to be locally available from the perspective of a user of the computing device and even other applications running on the computing device. For example, an icon for the application may appear within an application menu of the computing device. However, when a request is generated by the user (or another application) for the application, the computing device may quickly determine that it is currently in the dehydrated state. Then, based on this determination, the computing device may respond by performing an intermediary step (i.e., a step in between receiving the request and servicing the request) to fully download and hydrate the needed application files. After completing this intermediary step, the computing device may then fulfill the request as if the application files were hydrated when the request was initially received.

In an embodiment, a computing device has a storage medium that includes some application files stored in a hydrated state and other application files stored in a dehydrated state. As used herein, the term "hydrated state" when used to describe a state of file refers to a state in which the data for the file is stored locally on the storage medium of the computing device. For example, if a determination is made that an application is to be hydrated, then one or more of the binaries that are unique to this application are actually written to and take up space (e.g., bytes) on the storage medium. In contrast, the term "dehydrated state" when used to describe a state of a file refers to a state in which the data for the file is not stored locally on the storage medium of the computing device. For example, if an application is stored in a dehydrated state on the computing device, then binaries that are unique to this application are not written to and do not take up space on the storage medium.

With regard to automatically hydrating applications onto the local drive as needed, the computing device may receive a request for access to an application that is currently dehydrated. Upon receiving the request, the computing device may retrieve at least some metadata that is written to the storage medium in association with the requested application. For example, in some embodiments, placeholder files may be written to the storage medium in place of the actual files associated with dehydrated application. The placeholder files may comprise metadata that indicates an address from which the application files may be downloaded. In some embodiments, the placeholder files also indicate an application provider of the application files. Stated plainly, the individual placeholder files may point to the actual application files for which they are serving as placeholders.

The computing device may then use the placeholder metadata to generate a download request that is associated with the requested application file. In some embodiments, the computing device may provide the placeholder metadata to a synchronization engine to identify the requested application file from the appropriate location from which the requested application file can be obtained. Based on the placeholder metadata, the synchronization engine may then generate and send the download request to the appropriate data provider.

Various embodiments are further disclosed for installing operating system and other system components of a virtual machine in a "placeholder" format. In one embodiment, when operating system components and applications are configured for a virtual machine, instead of the entire set of files being installed, one or more placeholders are created instead. The placeholders contain the metadata (file names, sizes, time stamps, permissions, version, etc.) but not the contents. Only a minimal set of operating system components and applications are locally stored, and other operating system components and applications are dehydrated. When the virtual machine needs to launch a dehydrated application or a dehydrated operating system component, the file is retrieved from a remote location (e.g., a remote host) where the needed data for this file is stored.

By reducing the storage needed for a virtual machine until the files are actually needed, the amount of storage needed by one or more virtual machines may be substantially reduced. If the service provider implements a pay-as-you-go pricing model for storage, then the described embodiments may allow for a decrease in the costs associated with obtaining and running virtual machines. Additionally, enterprise administrators can provide a superset of every application that may be needed by enterprise virtual machine users in a seamless manner, where applications that are not present at the virtual machine can be provided on-demand without having to go through installation procedures.

In some embodiments, when a predetermined condition is met (age of the installation, storage used by a virtual machine, for example), one or more files may be converted to being a "placeholder". If the virtual machine needs to launch a function or application that has been replaced with placeholders, the function or application may be launched without the need for reinstallation.

The technologies described herein enable users of virtualized services to save storage space by foregoing writing the files needed for the operating system and applications to storage associated with the virtual machine and automatically downloading the files as the functions/applications are called upon. In an example embodiment, a virtual machine may be initially configured with some operating system components and applications in a hydrated state and other system components and applications in a dehydrated state. In the event that a dehydrated system component or application is invoked, the virtual machine may automatically download and locally store the files that are associated with the system component or application.

Due to the existence of the placeholder files, the dehydrated application or function may appear to be available from the perspective of the virtual machine and other applications running on the virtual machine. However, when a request is generated for the dehydrated application, the virtual machine may determine that it is currently in the dehydrated state. Then, based on this determination, the virtual machine may respond by performing an intermediary step (i.e., a step in between receiving the request and servicing the request) to fully download and hydrate the needed application files. After completing this intermediary step, the virtual machine may then fulfill the request as if the application files were hydrated when the request was initially received.

These and various other applications will be apparent from a reading of the following Detailed Description and a review of the associated drawings. This Summary is provided to introduce a selection of concepts in a simplified form that are further described below in the Detailed Description. This Summary is not intended to identify key applications or essential applications of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

Figure 1:
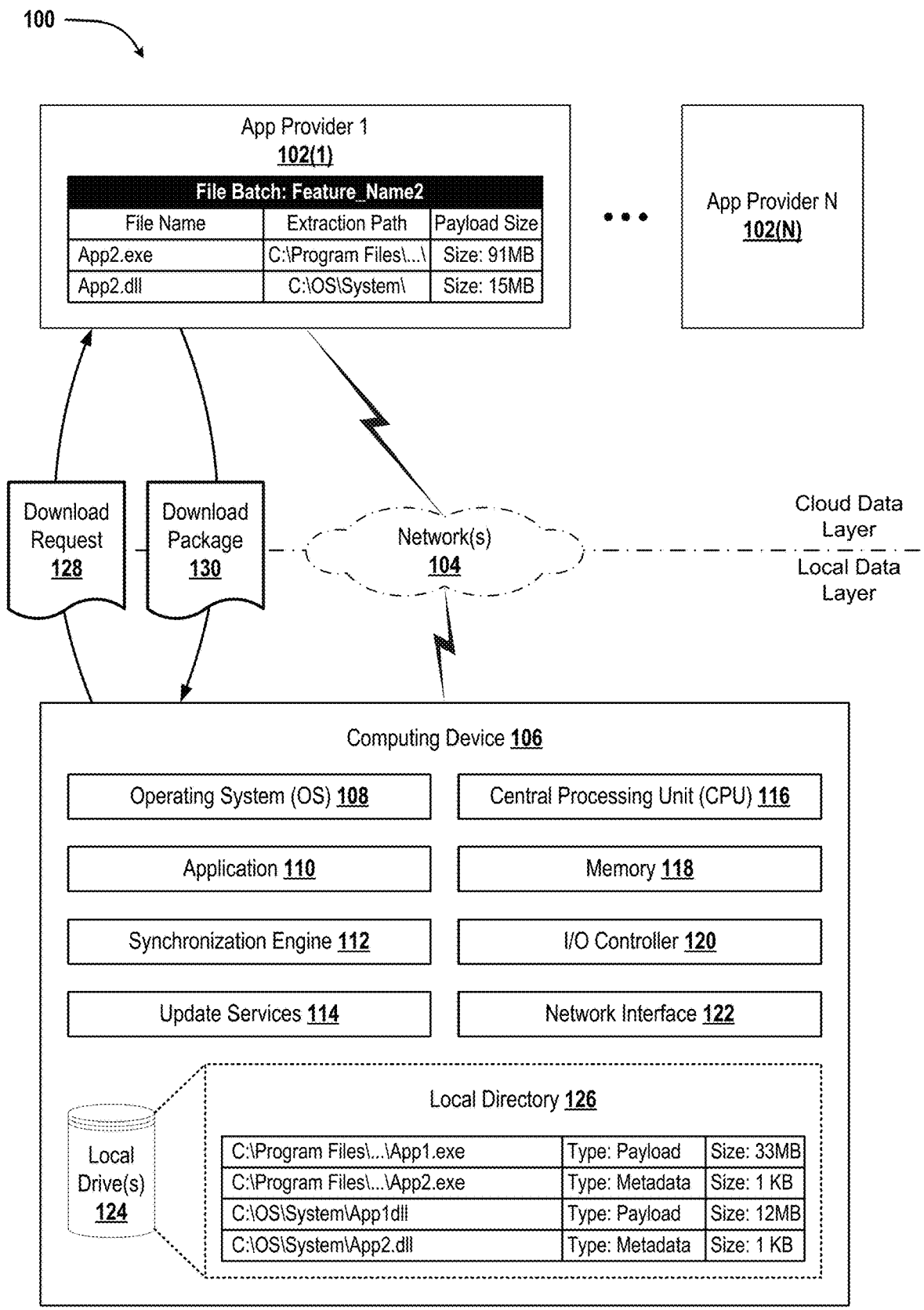
FIG. 1 illustrates an example system in accordance with the disclosure.

The following Detailed Description describes technologies that enable a computing device or virtual machine to save storage space by foregoing writing the data for application or operating system files to local storage and then automatically downloading the application or operating system files as associated applications are called upon.

As described above, the term "dehydrated file" may refer to a data file that is stored on a local drive of a client device in a format that makes the data file visible to a user in a file-browser GUI while at least some content data of the data file is absent from the local drive. For example, a dehydrated file may be a relatively small file that is stored locally on a client device to represent a hydrated counterpart file that is stored in a cloud database. An example dehydrated file may include a thumbnail image (e.g., a reduced-size visual representation of file content data) and placeholder metadata that identifies the name of the file and points to its hydrated counterpart in the cloud. More generally, we can define a dehydrated file as any file that has metadata but does not have the entire content on disk. Accordingly, hydration is the act of retrieving any content not already on disk by downloading it from the cloud.

As described above, the term "hydrated file" refers to a file for which file content data is stored on a local drive of a client device so that the data file can be accessed locally without fetching the file content data from a cloud database. A partially hydrated state is one where the file is mixed between hydrated and dehydrated. In the partially hydrated state some but not all of the content is on disk. The mechanisms described in this disclosure will address partially hydrated files as well as fully dehydrated files.

In a more general embodiment, a dehydrated file may be defined as any file that has metadata but does not have the entire content on disk. Hydration, then, is the act of retrieving any content not already on disk by downloading it from the cloud.

The disclosed technologies represent a substantial advantage over existing systems where applications and OS components are stored locally at a computing device or virtual machine. These shortcomings may exacerbate computing resource scarcity issues including the overuse of processing resources as well as the finite nature of local storage space. It can be appreciated, therefore, that the disclosed technologies represent a substantial advance toward reducing processor and storage usage associated with providing applications and functions on computing devices and virtualized resources.

Generally described, a computing device or virtual machine may be initially configured with files in a hydrated state and other files in a dehydrated state. As a specific example, an operating system (OS) that is running on a virtual machine may include some applications that are frequently used and other applications that are rarely used. To conserve storage space, the relative frequencies of use of the various applications may be weighed as a factor for selecting some batches of application files to store on the virtual machine in a hydrated state and other batches of application files to leave in a dehydrated state. For example, batches of application files that enable implementation of frequently used applications may be fully hydrated whereas other batches of application files that enable implementation of rarely used applications may be left dehydrated. Then, when a request is received that requests access to an individual dehydrated application file, the virtual machine may automatically retrieve, from an appropriate application provider, one or more application files that is associated with this dehydrated application file. For example, requesting a batch of files associated with the dehydrated application file may be retrieved. Alternatively, a single file may be retrieved as it is accessed. After receiving the specific batch of application files from the appropriate application provider, the virtual machine may fulfill the request by providing full access to the application that is now hydrated but that was previously dehydrated when the request was initially received. In this way, predetermined batches of application files remain immediately accessible at a virtual machine without perpetually consuming significant amounts of storage space on the virtual machine. That is, such predetermined batches of application files only consume significant storage space if actually called upon in a request—but are otherwise stored as metadata only which does not take up a significant amount of storage space.

As described in more detail below, in some embodiments, placeholder files are stored on an individual basis for dehydrated application files in lieu of the full version of these application files (i.e., payload and all). Exemplary such placeholder files may include placeholder metadata that indicates a application provider from which a corresponding application file can be readily obtained and/or an address from which the corresponding application file can be readily obtained. The metadata may also indicate whether a payload associated with the requested application file is currently written to the local drive.

As used herein, the term "application" refers to a specific computing functionality that can be performed by a computing device or virtual machine by use of one or more individual application files and/or batches of application files. The payloads for individual batches of application files may be downloaded and written to local storage of a computing device or virtual machine to enable that computing device to support additional applications such as, for example, additional hardware use cases or additional software use cases. As a specific example, a computing device or virtual machine may be equipped with a camera that is suitable for performing facial recognition techniques and a batch of application files may include software code that enables the computing device or virtual machine to implement such techniques via the camera. Thus, the batch of application files may include drivers and/or any other suitable type of computer readable instructions that are usable to implement a desired functionality. Exemplary applications include, but are not limited to, the wide array of computing functionalities that are available to add or remove from a computing device via the Applications on Demand (commonly referred to as "FODs") that are available for use on the MICROSOFT WINDOWS 10 operating system.

As used herein, the term "application file" refers to any computing file that is usable individually and/or in conjunction with one or more other computing files to enable a functioning computing device (e.g., a general-purpose computer that is executing a typical operating system) or virtual machine to implement an "application" as defined herein. For example, individual computing files of a group or batch of computing files that enables a general-purpose computer to perform a facial recognition application may be aptly referred to as application files. Such files may include binaries, media, extension associations, In some embodiments, a dehydrated application may be launched when core components have been downloaded and stored locally, before all of the associated application files are downloaded. This may allow for faster execution of a dehydrated application, in particular when a significant amount of data that is not immediately needed to launch the application has yet to be downloaded. The additional data may be downloaded in the background as the application executes.

In some embodiments, when an application is purchased, a core set of metadata may be stored on the computing device and larger files such as binaries and media may be downloaded at a later time when the application is launched. This may be useful when a device is on a limited bandwidth connection and the user wishes to purchase or otherwise install an application for later use.

It can be appreciated that when an application is dehydrated, uninstallation of such an application will be relatively simple as only the stored metadata associated with the dehydrated application needs to be removed from the device.

In some embodiments, applications may be selected for dehydration automatically based on one or more criteria. For example, such criteria may include:

applications that have not been accessed for more than a specified period of time a limit as to the amount of storage that is to be used for applications (the selection of which applications to dehydrate may be determined based on a prioritization scheme)

the user or administrator may be allowed to select which applications to dehydrate; in some embodiments, the user or administrator may be allowed to pin an application so that the application is not allowed to be dehydrated.

Dehydrated applications may be stored at a remote service, such as a storage service or a service configured to store dehydrated applications. For virtual machines, dehydrated applications may be stored at a host that provides a central depository for applications. In some embodiments, the host may be located to be geographically advantageous to the virtual machines. In some embodiments the remote service or central depository may track versions of applications and provide the latest version of an application so that devices or virtual machines that download dehydrated applications will always receive the latest versions of the applications.

Turning now to FIG. 1, illustrated is a system 100 for enabling a computing device 106 to store predetermined files in a dehydrated state on a local drive 124 while retaining on-demand accessibility of the files at the computing device 106. In the illustrated example, a first batch of files that corresponds to an application titled "App1" is stored in a hydrated state such that a payload of each individual application file within this first batch is stored on the local drive 124 of the computing device 106. The respective payloads of the individual application files may include, for example, binaries, permissions, registry settings, extension settings, and other data that is usable to implement the application. Also shown in the illustrated example, a second batch of files that corresponds to an application titled "App2" is stored in a dehydrated state such that placeholder files are stored in place of the actual application files of this batch. In some embodiments, the placeholder files are stored within a local directory 126 of the computing device 106 at the same path as the actual application files would be stored if hydrated (e.g., with payload written to local storage) onto the computing device 106. In this way, user interactions with the computing device 106 that result in an actual application file being called at a specific file path will turn up the actual application file, if present, or the respective placeholder if the called upon application file is not hydrated onto the computing device 106. The placeholder files do not include a payload of the associated actual files but rather include metadata that indicates properties of the corresponding actual files (e.g., the full file with corresponding payload). The metadata associated with any particular file may indicate an application provider from which the particular file, including the corresponding payload, may be obtained. As described in more detail below, when a particular batch of files is in a dehydrated state, the metadata from a placeholder file in this particular batch may be used by the computing device 106 to retrieve all of the actual files for that particular batch on-demand when a single file associated with the placeholder file from the batch is requested.

For purposes of adequately conveying the concepts and technical benefits described herein, it may be beneficial to prescribe a data size to the respective payloads for actual application files and to the metadata for placeholder files. Thus, as illustrated, the second batch of files includes two actual files that are named "App2.exe" and "App2.dll" with payloads of 91 MB and 15 MB, respectively (shown in the cloud data layer on the application provider 102(1)). As further illustrated, the two placeholder files corresponding to these two actual files are a mere 1 KB each (shown in the local data layer on the local drive 124). Thus, under these specific but nonlimiting circumstances, the second batch of application files will consume a mere 2 KB of local storage space when stored in a dehydrated state in contrast to 106 MB of local storage space when stored in a hydrated state.

The computing device 106 may include an application 110 that is installed onto the local drive 124. In some embodiments, at least some batches of files that are usable to implement various applications of the application 110 may be stored on the local drive 124 in a dehydrated state. In particular, it should be appreciated that the techniques described herein are usable to reduce the software footprint of the OS 108 and/or the application 110. This reduction in the software footprint is accomplished by storing files which are usable to implement the application 110 in a dehydrated state. Configuring the computing device 106 according to the techniques described herein enables users and/or software components to issue requests (e.g., call upon) for dehydrated application files and to have these requests serviced just as if the dehydrated application files were fully hydrated at the time when the request was generated. This is accomplished by automatically hydrating the requested application files (and in some embodiments other commonly batched application files) immediately upon receiving a request. Then, following this intermediary step of hydrating the requested application files, the computing device 106 may then respond to the request by provisioning access to the payload of the newly hydrated application file. That is, the computing device 106 receives the request when the payload is not locally available and slightly delays responding to the request until after having downloaded and/or written the payload to the local drive 124.

In some implementations, the computing device 106 may utilize a synchronization engine 112 for retrieving download packages when requests are issued that seek access to files that are currently dehydrated on the computing device 106. For example, when the OS 108 receives a request that identifies a specific application that is currently dehydrated, the OS 108 may retrieve metadata that is stored in a placeholder file for the specific application. The OS 108 may then provide the metadata to the synchronization engine 112 to cause a download request 128 to be transmitted to an application provider 102(1) that is associated with the specific application. As described above, the metadata that is stored in the placeholder file may include an identification of which application provider (of numerous potential application providers) from which the requested application file can be obtained. As used herein, the term "metadata" refers specifically to a set of data that provides information about a corresponding file and, more particularly, about how the computing device 106 can acquire a payload associated with the corresponding file. In some embodiments, the metadata may also indicate whether the payload for the requested application is currently written to the local drive of the computing device. Stated alternatively, the metadata may include an indication of whether or not the application that is specifically requested is currently hydrated at the computing device.

The download request 128 may include an identification of the requested application for which access has been requested. In some instances, the download request 128 may omit any specific identification of the individual files. For example, the request may be generated based on a user entering a run command to start a currently dehydrated application by accessing an associated executable (e.g., ".exe") file. In this example, the run command may specifically reference the file named "App2.exe" without referencing the related file named "App2.dll." Thus, this run command may cause the OS 108 to generate a request for access to the file named "App2.exe." In response to the request, the synchronization engine 112 may generate a download request 128 for this specifically requested application file only but does not request the related file named "App2.dll"—even though these files are commonly batched. One reason that the synchronization engine 112 might not identify all of these commonly batched application files in the download request 128 is that the various components of the computing device 106 may lack visibility as to which files are batched together. For example, the OS 106 may be designed to simply fulfill requests on an application basis and the requested files may omit indications as to any relationships to other files they may have. Exemplary synchronization engines 112 include, but are not limited to, SYNC API developed by DROPBOX, BACKUP AND SYNC developed by GOOGLE, and the ONEDRIVE UNIVERSAL WINDOWS PLATFORM (UWP) APP for MICROSOFT'S WINDOWS 10. Accordingly, it can be appreciated that the synchronization engine 112 may be a native component of the OS 108 or may be an add-on component that is downloaded and installed onto the client device 106 separately from the OS 108.

Upon receiving the download request 128, the first application provider 102(1) may identify an entire predefined batch of files to which the requested application belongs. For example, as illustrated, the first application provider 102(1) may determine that the requested application (e.g., the file named "App2.exe") belongs to a batch of application files named "File Batch: App2"). Then, rather than returning merely the requested file, the first application provider 102(1) may return a download package 130 that includes the entire identified batch of application files. Thus, in the illustrated example, in response to the download request 128 identifying the single file named "App2.exe," the first application provider 102(1) returns both of the requested "App2.exe" file and also the "App2.dll" file—and any other application files that are commonly batched. In some embodiments, the first application provider 102(1) may return the download package 130 in the form of a compressed archive file to increase the speed at which the entire batch of application files becomes hydrated on the computing device 106. Since while implementing the desired application the computing device 106 is likely going to request access to the other application files within a batch, delivering the download package 130 as a compressed archive folder also decreases the overall network bandwidth that would otherwise be consumed if each application file were individually delivered as requested by the computing device 106.

Upon receipt of the download package 130, the computing device 106 may write each of the individual files onto the local drive 124 (e.g., a hard disk, a solid-state hard drive, or any other suitable volatile or non-volatile storage medium) in order to convert the individual application files from the dehydrated state into the hydrated state. In some embodiments, once the entire batch of files is fully hydrated (or while the batch is actively being hydrated), the computing device 106 services the request by provisioning access to the requested application by using the newly downloaded payload thereof. Alternatively, the computing device 106 may service the request by provisioning access to the newly downloaded payload of the requested application even before the payload is written to the local drive 124. For example, the request may be serviced by directly loading the payload from the download package into a memory or cache of the computing device 106.

In some implementations, the computing device 106 further includes update services 114 that are configured to automatically update various components such as, for example, the OS 108 and/or the application 110. For example, as new versions of the OS 108 and/or application 110 become available from a corresponding provider, the update services 114 may download the installation files (e.g., a cabinet file having the ".cab" extension) and then install the already downloaded installation files at an appropriately scheduled time (e.g., during off-peak usage). In some embodiments, the update services 114 are further configured to automatically update the metadata that corresponds to specific dehydrated applications when updates to the dehydrated applications become available from an application provider 102. For example, the update services 114 may periodically communicate with the application provider(s) 102 for the various applications that are currently dehydrated on the computing device 106 to determine when new version(s) of the files become available. Then, as the new version(s) of the files become available, the update services 114 may update the metadata that is stored in the placeholder for the files so that the "updated" metadata now indicates how to obtain the updated files and updated payloads thereof. For example, the metadata may be undated so that the previous addresses in the metadata that indicated where to download the previous version of the application files are overwritten with new addresses that indicate where to download the new versions of the files.

As further illustrated, the computing device 106 includes a central processing unit ("CPU") 116 that is connected, via a bus (not shown in FIG. 1), to various components such as the local drive 124, a memory 118, an input/output (I/O) controller 120, and/or a network interface 122. It can be appreciated that the system components described herein (e.g., the application(s) 110, the OS 108, and/or the synchronization engine 112) may, when loaded into the CPU 116 and executed, transform the CPU 116 and the overall computing device 106 from a general-purpose computing system into a special-purpose computing system customized to facilitate the functionality presented herein. The CPU 116 may be constructed from any number of transistors or other discrete circuit elements, which may individually or collectively assume any number of states. More specifically, the CPU 116 may operate as a finite-state machine, in response to executable instructions contained within the software modules disclosed herein. These computer-executable instructions may transform the CPU 116 by specifying how the CPU 116 transitions between states, thereby transforming the transistors or other discrete hardware elements constituting the CPU 116.

The local drive 124 and associated computer-readable media provide non-volatile storage for the computing device 106. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 106. For purposes of the claims, the phrase "computer storage medium," "computer-readable storage medium," and variations thereof, does not include waves, signals, and/or other transitory and/or intangible communication media, per se.

The I/O controller 120 may receive and process input from a number of other devices, including a keyboard, mouse, or electronic stylus (not shown in FIG. 1). Similarly, the I/O controller 120 may provide output to a display screen (e.g., to display the file-browser GUI described herein), a printer, or other type of output device (also not shown in FIG. 1). The network interface 122 may enable the computing device 106 to connect to one or more network(s) 104 such as a local area network (LAN), a wide area network (WAN), a wireless local area network (WLAN), or any other suitable network for passing information between the computing device 106 and the application provider(s) 102.

Figure 2A:
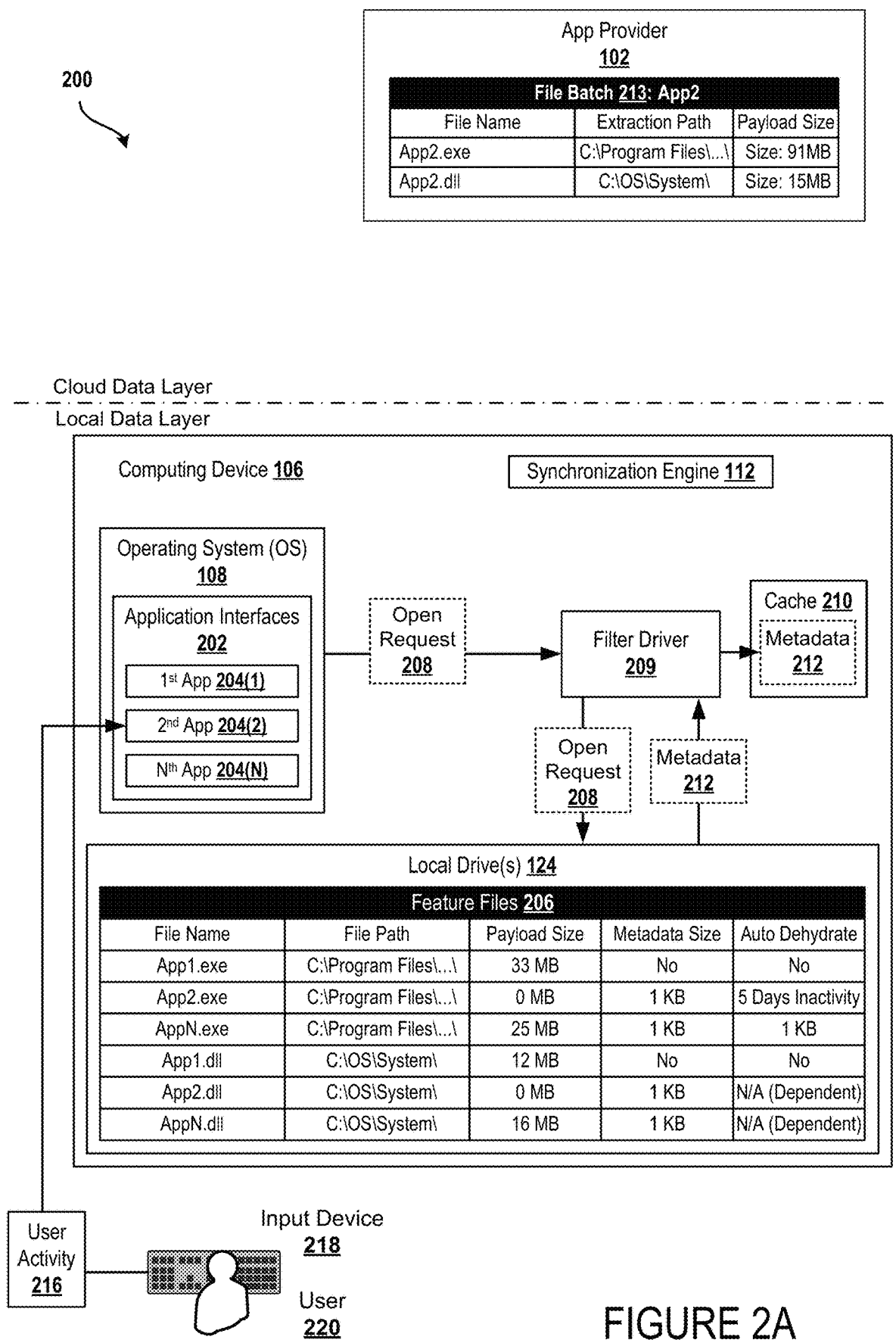
FIG. 2A illustrates an example dataflow scenario in accordance with an embodiment.

Turning now to FIG. 2A, an example dataflow scenario 200 is illustrated in which the computing device 106 performs an open request 208 for a requested application that is currently stored on the local drive 124 in a dehydrated state. As illustrated, the computing device 106 may receive user activity 216 that is generated based on a user 220 interacting with an input device 218 (e.g., a keyboard, a mouse, a touchscreen, a microphone, or any other suitable input component). The user 220 may perform the user activity 216 via the input device 218 to request access to applications—regardless of whether those applications are currently hydrated on the computing device 106. As illustrated, the OS 108 includes application interfaces 202 that are usable to access each of a first application 204(1) through an Nth application 204(N).

In various embodiments, the application interfaces 202 may be represented (e.g., graphically displayed) by the computing device 106 to the user 220 in a consistent manner for individual application 204 regardless of whether those individual applications are currently hydrated on the computing device 106. For example, a particular one of the application interfaces 202 may be designed to expose an icon to the user 220 that is selectable to cause the computing device 106 to implement a particular application. The application interfaces 202 may cause this icon to be exposed to the user 220 even when the underlying application 204 that performs the particular application is dehydrated on the computing device 106. That is, the icon is exposed to and/or is selectable by the user 220 even if the payloads for the files 206 that actually enable the computing device 106 to launch the particular application is not present in the local drive 124.

For purposes of FIG. 2A, the state of the computing device 106 is such that the application interfaces 202 expose representations of a first application 204(1), a second application 204(2), and an Nth application 204(N). The state of the computing device 106 is further implemented such that the first application 204(1) and the Nth application 204(N) are fully hydrated on the computing device 106. For example, as illustrated, a plurality of application files 206 that enable implementation application the first application 204(1) and the Nth application 204(N) are shown to be written to the local drive(s) 124. Specifically, each of the application files named "App1.exe," "AppN.exe," "App1.dll," and "AppN.dll" are shown as having their payloads fully written to the local drive 124. Individual ones of the application files 206 may include various properties such as a file name, a file path, a payload size, a metadata size, and/or an auto-dehydrate parameter. For purposes of the present discussion, values are prescribed for each of these properties in a table that extends downward from the black application file box that is labeled 206. These values are used solely to convey aspects of the present disclosure and are not intended to be limiting in any way.

In the illustrated example, the hydrated status of the first application 204(1) results in 33 MB of storage being consumed to store the application file named "App1.exe," and also an additional 12 MB of storage being consumed to store the application file named "App1.dll." As further illustrated, some additional 41 MB of storage is consumed in order to retain a hydrated status of the Nth application 204(N). In contrast to the first and Nth applications, the second application 204(2) is dehydrated in the state of the computing device 106 illustrated in FIG. 2A. That is, the individual application files 206 that uniquely correspond to the second application 204(2) are shown to be in a dehydrated state such that the payloads of these application files are not stored locally on the local drive(s) 124. Thus, as illustrated, even though the second application 204(2) is implemented using a batch of two application files that together would require an allocation of 106 MB of local drive space to be fully hydrated on the computing device 106, these application files are stored locally in a dehydrated state that omits the actual payloads but includes metadata with information that is usable to obtain the payloads if requested. These dehydrated application files may serve as placeholders to the hydrated application files (e.g., that include the payloads) and the metadata may indicate an application provider from which the corresponding hydrated application files can be readily obtained and/or an address from which the corresponding hydrated application files can be readily obtained. In the illustrated embodiment, the fully hydrated application files are stored by a application provider 102 as part of a file batch that uniquely corresponds to the second application 204(2).

With respect to the specific data flow scenario 200 illustrated in FIG. 2A, the user activity 216 that is received in association with the application interfaces 202 results in a series of interactions between various components of the computing device 106 and the application provider 102. For example, as illustrated, the user activity 216 results in an open request 208 being transmitted from the OS 108 to a filter driver 209. For purposes of the present discussion, presume that the open request 208 is requesting data associated with the application file named "App2.exe." The filter driver 209 may be a file system driver such as, for example, the "cldflt.sys" driver that is commonly deployed in conjunction with Microsoft's OneDrive. As described above, the application files 206 include both fully hydrated application files and dehydrated application files (e.g., placeholder files). The filter driver 209 assists with handling requests for access to the various application files that are stored in the local drive 124. For example, as illustrated, when a user performs some computing action that causes generation of an open request 208 in association with a particular application file, the filter driver 209 passes the open request 208 through to the local drive 124. In some embodiments, the open request 208 may include a reparse point that tags one or more fields of metadata 212 associated with the requested file. The reparse point may inform the filter driver 212 of which field of the metadata is indicative of the hydration status of the requested application file. For example, the filter driver 209 may query the local drive 124 for data associated with the requested application file based on the open request 208. If the payload for the requested application file is stored locally on the local drive 124, then the filter driver 209 may simply service the open request 208 as normal. In contrast, if the filter driver 209 queries the local drive 124 and determines that the requested application file is dehydrated such that the payload is not available from the local drive 124, then the filter driver 209 may obtain the metadata 212 that is stored in association with the dehydrated file and store this metadata 212 in a cache 210.

Figure 2B:
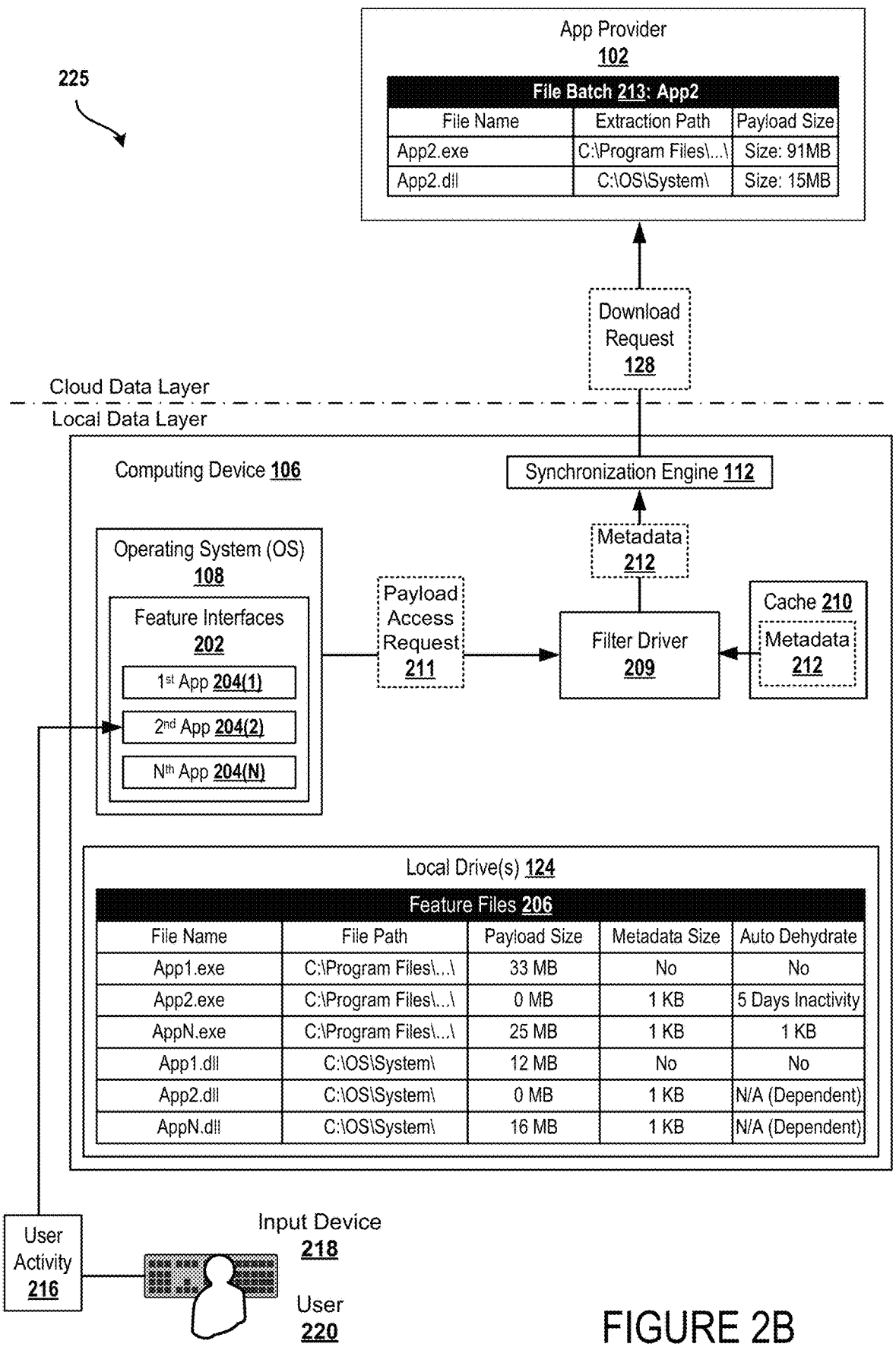
FIG. 2B illustrates an example dataflow scenario in accordance with an embodiment.

Turning now to FIG. 2B, illustrated is an exemplary dataflow scenario 225 in which the computing device responds to a payload access request 211 by transmitting a download request 128 to an appropriate application provider. As illustrated, after the filter driver 209 having already cached the metadata 212 responsive to the open request 208, the OS 108 then transmits the payload access request to the filter driver 209. An example payload access request 211 may be a read request associated with the requested application file (e.g., the OS may request to read some portion of the payload for the requested application file). As another example, the payload access request 211 may be a write request associated with the requested application file (e.g., the OS may request to write data to some portion of the payload for the requested application file).

Responsive to the payload access request 211, the synchronization engine 112 may then generate a download request 128 based on the metadata 212. In some embodiments, the metadata 212 may include an address from which the requested application file can be obtained. Additionally, or alternatively, the metadata 212 may indicate an appropriate application provider from which the requested application file can be obtained. For example, as described above, the request 208 is requesting access to the application file named "App2.exe." Therefore, the download request 128 may include an identifier of the particular application provider 102 that is shown in FIG. 2A since this particular application provider 102 may provide access to the file batch 213 that is entitled "App2." In some embodiments, the download request 128 is transmitted to the application provider 102 in response to the first payload access request 211 that is received following the initial open request 208 that resulted in the caching of the metadata 212. It will be appreciated that such embodiments may reduce unnecessary network traffic because under a variety of circumstances an open request 208 may be received that requests data associated with file properties only without any subsequent request for actual access to the payload ever being issued. Thus, some embodiments may refrain from hydrating application files upon receipt of a corresponding open request but rather will wait until a payload access request is received.

Figure 2C:
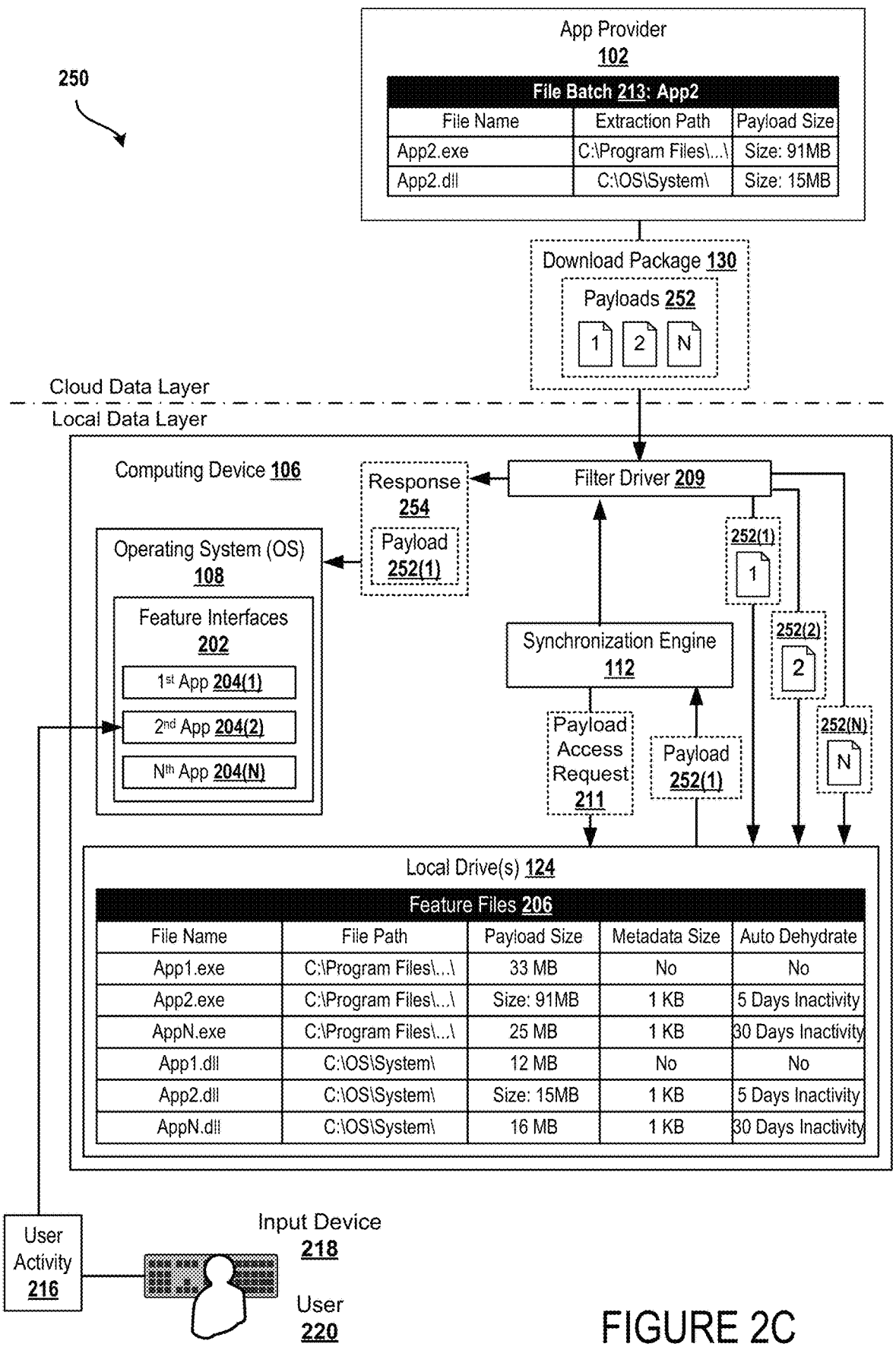
FIG. 2C illustrates an example dataflow scenario in accordance with an embodiment.

Turning now to FIG. 2C, an example dataflow scenario 250 is illustrated in which the computing device 106 responds to the payload access request 211 of FIG. 2B after having intermediately downloaded and hydrated the requested application file by obtaining and writing the corresponding payload to the local drive 124. As illustrated, the computing device 106 receives a download package 130 from the application provider 102. The download package 130 is provided in response to the download request 128. Furthermore, the download package 130 may include an entire batch of files to which the requested application file belongs. For example, in the present example, presume that the download request 128 identifies "App2.exe" as being the particular file that is being immediately requested in the request 208. Under these circumstances, the application provider 102 may identify the file named "App2.exe" as being a part of the file batch 213 that is entitled "App2." Then, rather than returning merely the requested application file, the application provider 102 may return the entire File Batch 213 within the download package 130. Under the present circumstances, since the download request 128 identifies the "App2.exe" file, then the application provider 102 may retrieve not only the "App2.exe" file but also the "App2.dll" file and/or any of parts of the payload for the application 204(2) that is currently dehydrated on the computing device. Then, the application provider 102 responds to the download request 128 for the single file by providing a download package 130 that includes all application files from the entire predefined batch of application files 206. In the illustrated embodiment, the download package 130 includes $1^{st}$ through Nth payloads 252.

Upon receiving the download package 130, the synchronization engine 112 writes the payloads for the individual application files within the file batch 213 to the local drive 124. For example, the computing device 106 and/or synchronization engine 112 may decompress the download package 130 and write each of the included application files onto the local drive 124 (e.g., a hard disk, a solid-state hard drive, or any other suitable volatile or non-volatile storage medium) in order to convert these application files from the dehydrated state to the hydrated state. Thus, based on the initial request 208 that requested access to only the single application file (e.g., the "App2.exe" file) of the file batch 213, various system components such as the filter driver 209, the synchronization engine 112, and the application provider 102 work together to fully hydrate the entire batch of application files (even those not yet requested) by downloading and then locally storing all of their corresponding payloads. Then, once the entire batch 213 of application files is fully hydrated (or while the batch is actively being hydrated), the computing device 106 services the request 208 by providing a response 254 to the OS—where the response 254 provides access to the payloads 252 that are newly downloaded to the computing device and written to the local drives 124 thereof.

In some embodiments, an entire payload for the requested application file may be fully hydrated in response to an initial receipt of any payload access request. In this way, as soon as any portion of a payload is requested for a particular application file, the entire payload then becomes fully hydrated and available from the local drive. In other embodiments, specific portions of a payload for the requested application file may be hydrated onto the local drive incrementally as numerous incremental payload access requests are received. For example, a first payload access request may be received that requests access to a specific portion of the payload for the requested application file. This first payload access request may trigger the hydration of one or more other portions of the payload that are proximate to the requested portion. For example, if the requested application file is a map file that defines various rooms in a map of a three-dimensional first person perspective video game, then a payload access request for a portion of the payload that defines a specific room may trigger the hydration of other portions of the payload that define adjacent rooms. In this way, if the player walks from the specific room into any other adjacent room, then the data needed to render the appropriate adjacent room is fully hydrated and ready to use from the local drive.

As illustrated in FIGS. 2A-2B, in some embodiments, the metadata 212 that is usable for identifying and contacting an appropriate application provider 102 from which individual application files 206 can be obtained is stored on the local drive 124 even for fully hydrated application files. In this way, individual application files 206 can be converted from a hydrated state to a dehydrated state simply by deleting the associated payload from the local drive 124. In this way, dehydrating individual application files does not require the computing device 106 to communicate with the application provider 102 to obtain and store metadata 212. Rather, the metadata 212 can in some embodiments be permanently stored on the computing device 106 so that in the event that the payloads 252 are corrupted or deleted (inadvertently or intentionally), the computing device 106 retains the ability to cause the filter driver 209 and the synchronization engine 112 to work together to obtain and fully hydrate any desired application files 206.

In some embodiments, individual ones of the application files 206 include an auto-dehydrate parameter that indicates one or more conditions under which the computing device 106 is to deallocate storage capacity of the local drive 124 from the payload 252 for any particular application file 206. In some instances, deallocating storage capacity for a payload 252 may include actually deleting the payload from the local drive 124. In some instances, deallocating storage capacity for a payload 252 may include permitting the computing device 106 to overwrite storage capacity that is currently used to store the payload 252. As illustrated, for example, the application files 206 may be associated with auto-dehydrate parameters that restrict the individual files from being dehydrated or, alternatively, set a time period of inactivity after which the individual files are to be dehydrated. For example, the application files 206 that are associated with the $1^{st}$ application 204(1) have an auto-dehydrate parameter of "No" that restricts these application files 206 from being dehydrated. Such a parameter may be suitable for "core" OS applications or any other application or application files thereof that are to remain permanently hydrated on the computing device 106. As another example, the application files 206 associated with the $2^{nd}$ application 204(2) and the Nth application 204(N) each have a corresponding auto-dehydrate parameter that sets a time period of inactivity after which these application files are to be dehydrated on the computing device 106. In the specific but non-limiting example illustrated in FIGS. 2A-2B, the application file entitled "App2.exe" will be automatically dehydrated if 5 days pass without it being accessed. Such a parameter may be suitable for application files that correspond to a seldom used application so that these application files are automatically hydrated when called upon and then automatically dehydrated if unused for the prescribed time period (e.g., 5 days in this example).

Figure 3:
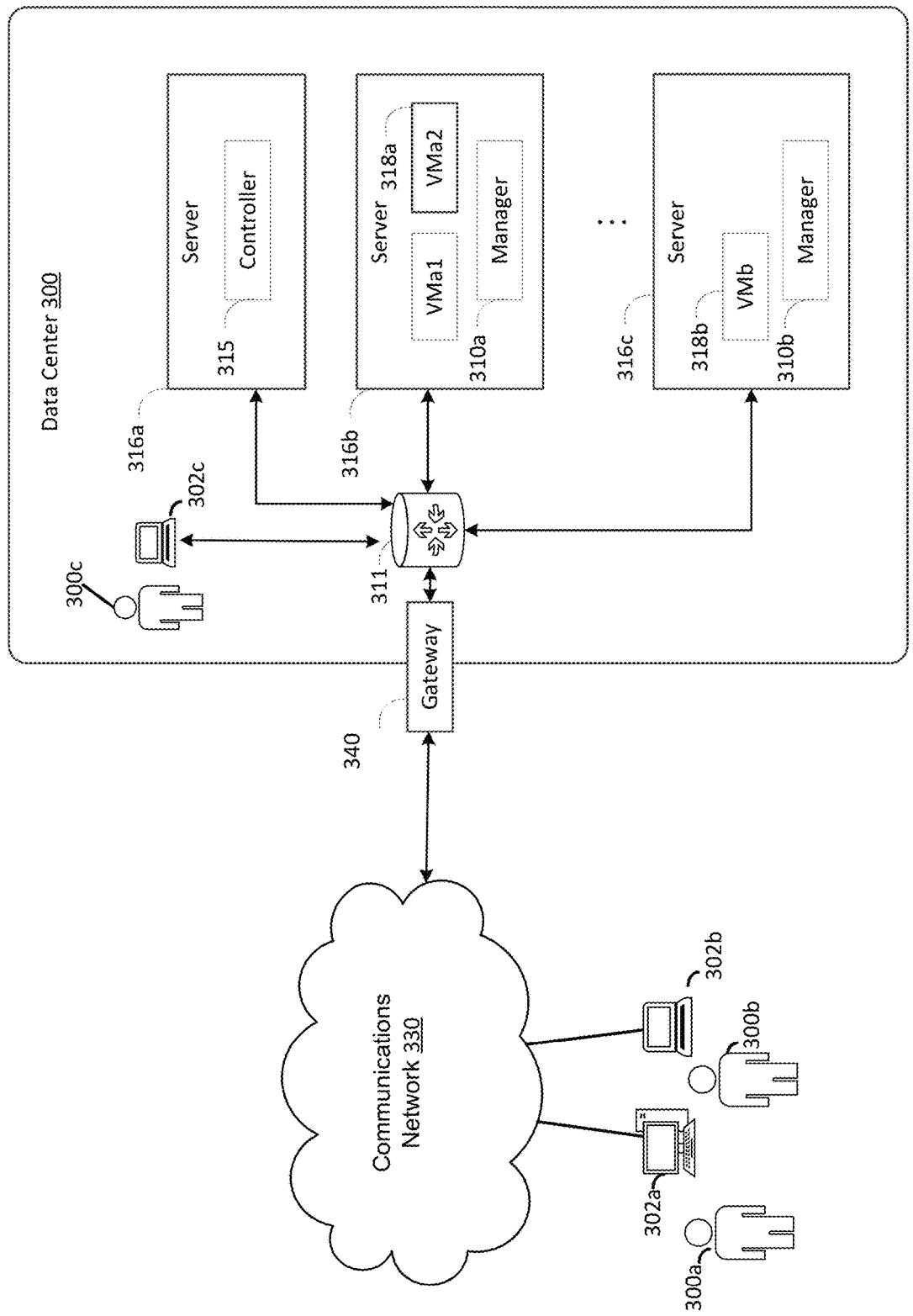
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 302a, 302b, and 302c (which may be referred herein singularly as "a computer 302" or in the plural as "the computers 302") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may include servers 316a, 316b, and 316c (which may be referred to herein singularly as "a server 316" or in the plural as "the servers 316") that provide computing resources available as virtual machines 318a and 318b (which may be referred to herein singularly as "a virtual machine 318" or in the plural as "the virtual machines 318"). The virtual machines 318 may be configured to execute applications such as Web servers, application servers, media servers, database servers, and the like. Other resources that may be provided include data storage resources (not shown on FIG. 3) and may include file storage devices, block storage devices, and the like. Servers 316 may also execute functions that manage and control allocation of resources in the data center, such as a controller 315.

Controller 315 may be a fabric controller or another type of program configured to manage the allocation of virtual machines on servers 316.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 302. Computers 302 may be computers utilized by users 300. Computer 302a, 302b or 302c may be a server, a desktop or laptop personal computer, a tablet computer, a smartphone, a set-top box, or any other computing device capable of accessing data center 300. User computer 302a or 302b may connect directly to the Internet (e.g., via a cable modem). User computer 302c may be internal to the data center 300 and may connect directly to the resources in the data center 300 via internal networks. Although only three user computers 302a, 302b, and 302c are depicted, it should be appreciated that there may be multiple user computers.

Computers 302 may also be utilized to configure aspects of the computing resources provided by data center 300. For example, data center 300 may provide a Web interface through which aspects of its operation may be configured through the use of a Web browser application program executing on user computer 302. Alternatively, a stand-alone application program executing on user computer 302 may be used to access an application programming interface (API) exposed by data center 300 for performing the configuration operations.

Servers 316 may be configured to provide the computing resources described above. One or more of the servers 316 may be configured to execute a manager 310a or 310b (which may be referred herein singularly as "a manager 310" or in the plural as "the managers 310") configured to execute the virtual machines. The managers 320 may be a virtual machine monitor (VMM), fabric controller, or another type of program configured to enable the execution of virtual machines 318 on servers 316, for example.

It should be appreciated that although the embodiments disclosed above are discussed in the context of virtual machines, other types of implementations can be utilized with the concepts and technologies disclosed herein.

In the example data center 300 shown in FIG. 3, a network device 311 may be utilized to interconnect the servers 316a and 316b. Network device 311 may comprise one or more switches, routers, or other network devices. Network device 311 may also be connected to gateway 340, which is connected to communications network 330. Network device 311 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
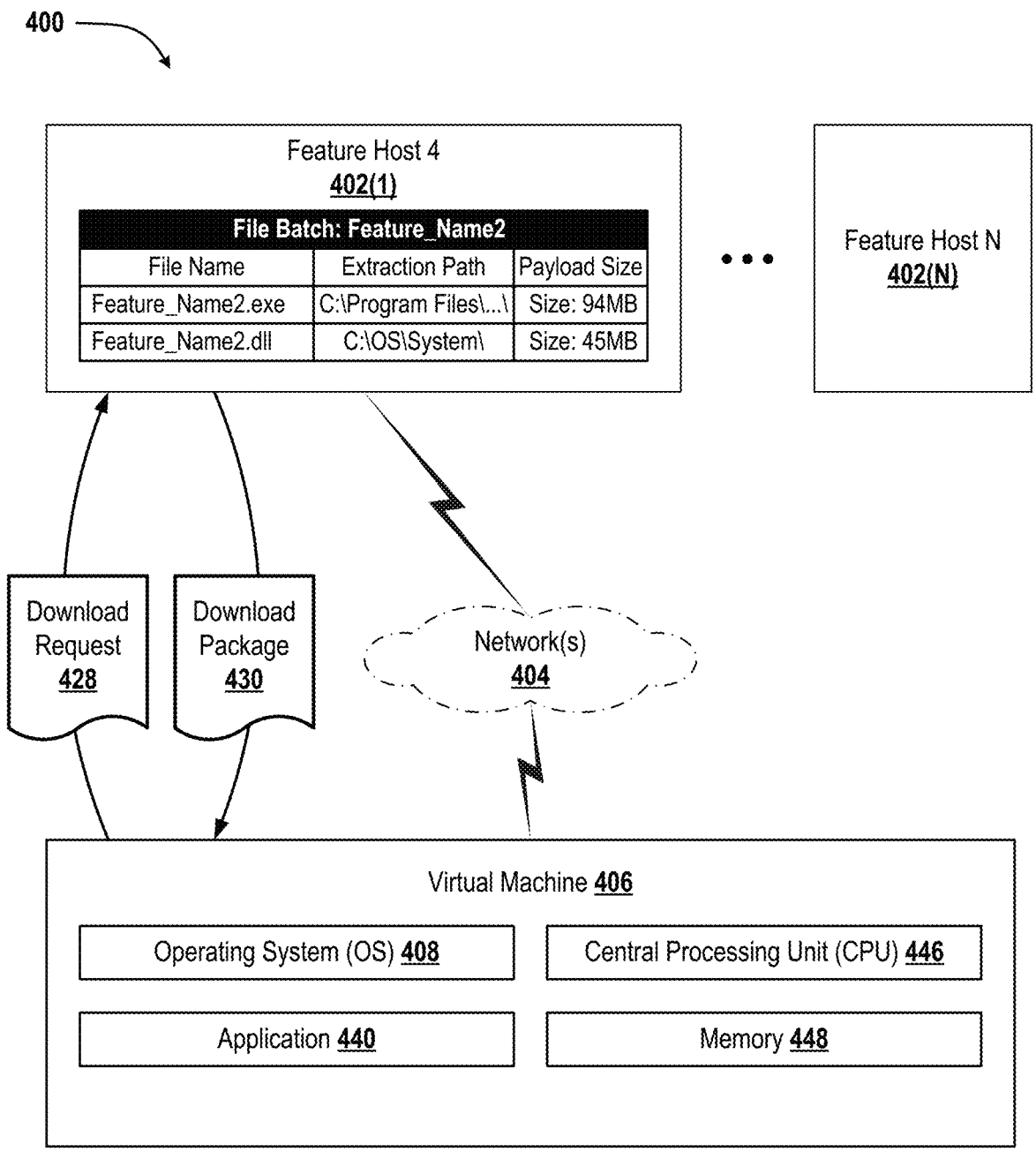
FIG. 4 illustrates an example system in accordance with the disclosure.

Turning now to FIG. 4, illustrated is an example system 400 for enabling a virtual machine 406 to store predetermined batches of feature files in a dehydrated state while retaining on-demand accessibility of the predetermined batches of feature files at the virtual machine 406. In the illustrated example, a first batch of feature files that corresponds to a feature titled "Feature_Name2" is stored in a hydrated state such that a payload of each individual feature file within this first batch is stored on the virtual machine 406. The respective payloads of the individual feature files may include, for example, binaries, permissions, registry settings, and other data that is usable to implement a specific feature. Also shown in the illustrated example, a second batch of feature files that corresponds to a feature titled "Feature_Name2" is stored in a dehydrated state such that placeholder files are stored in place of the actual feature files of this batch. In some embodiments, the placeholder files are stored within the virtual machine 406 at the same path as the actual feature files would be stored if hydrated (e.g., with payload written to local storage) onto the virtual machine 406. In this way, user interactions with the virtual machine 406 that result in an actual feature file being called at a specific file path will turn up the actual feature file, if present, or the respective placeholder if the called upon feature file is not hydrated onto the virtual machine 406. The placeholder files do not include a payload of the associated actual feature files but rather include metadata that indicates properties of the corresponding actual feature files (e.g., the full feature file with corresponding payload). The metadata associated with any particular feature file may indicate a feature provider from which the particular feature file, including the corresponding payload, may be obtained. As described in more detail below, when a particular batch of feature files is in a dehydrated state, the metadata from a placeholder file in this particular batch may be used by the virtual machine 406 to retrieve all of the actual feature files for that particular batch on-demand when a single feature file associated with the placeholder file from the batch is requested.

As illustrated, the virtual machine 406 may include an operating system (OS). To facilitate operation of the virtual machine 406, at least some batches of feature files that are usable to implement various "core" and/or frequently used features of the OS 408 may be fully hydrated on the virtual machine 406. To reduce the overall amount of storage space that is consumed on the virtual machine 406, at least some other batches of feature files that are usable to implement other features of the OS 408 are left dehydrated on the virtual machine 406—unless called upon as described below.

The virtual machine 406 may further include an application 440 that is installed onto the local drive 424. In some embodiments, at least some batches of feature files that are usable to implement various features of the application 440 may be stored in a dehydrated state. In particular, it should be appreciated that the techniques described herein are usable to reduce the software footprint of the OS 408 and/or the application 440. This reduction in the software footprint is accomplished by selectively storing individual batches of feature files which are usable to implement select features of the OS 408 and/or the application 440 in a dehydrated state. Configuring the virtual machine 406 according to the techniques described herein enables users and/or software components to issue requests (e.g., call upon) for dehydrated feature files and to have these requests serviced just as if the dehydrated feature files were fully hydrated at the time when the request was generated. This is accomplished by automatically hydrating the requested feature files (and in some embodiments other commonly batched feature files) immediately upon receiving a request. Then, following this intermediary step of hydrating the requested feature files, the virtual machine 406 may then respond to the request by provisioning access to the payload of the newly hydrated feature file. That is, the virtual machine 406 receives the request when the payload is not locally available and slightly delays responding to the request until after having downloaded and/or written the payload to the virtual machine.

In some implementations, the virtual machine 406 may utilize a synchronization function for retrieving download packages when requests are issued that seek access to feature files that are currently dehydrated on the virtual machine 406. For example, when the OS 408 receives a request that identifies a specific feature file that is currently dehydrated, the OS 408 may retrieve metadata that is stored in a placeholder file for the specific feature file. The OS 408 may then provide the metadata to the synchronization function to cause a download request 428 to be transmitted to a feature host 402(1) that is associated with the specific feature file. As described above, the metadata that is stored in the placeholder file may include an identification of which feature provider (of numerous potential feature providers) from which the requested feature file can be obtained. As used herein, the term "metadata" refers specifically to a set of data that provides information about a corresponding feature file and, more particularly, about how the virtual machine 406 can acquire a payload associated with the corresponding feature file. In some embodiments, the metadata may also indicate whether the payload for the requested feature file is currently written to the virtual machine. Stated alternatively, the metadata may include an indication of whether or not the feature file that is specifically requested is currently hydrated at the virtual machine.

The download request 428 may include an identification of the requested feature file for which access has been requested. In some instances, the download request 428 may omit any specific identification of the other feature files—such as those that are commonly batched with the requested feature file. For example, the request may be generated based on a user entering a run command to start a currently dehydrated feature and/or application by accessing an associated executable (e.g., ".exe") file. In this example, the run command may specifically reference the file named "Feature_Name2.exe" without referencing the related file named "Feature_Name2.dll." Thus, this run command may cause the OS 408 to generate a request for access to the file named "Feature_Name2.exe." In response to the request, the synchronization function may generate a download request 428 for this specifically requested feature file only but does not request the related file named "Feature_Name2.dll"—even though these files are commonly batched. One reason that the synchronization function might not identify all of these commonly batched feature files in the download request 428 is that the various components of the virtual machine 406 may lack visibility as to which files are batched together. For example, the OS 406 may be designed to simply fulfill requests on a file-by-file basis and the requested feature files may omit indications as to any relationships to other files they may have. The synchronization function may be a native component of the OS 408 or may be an add-on component that is downloaded and installed onto the virtual machine 406 separately from the OS 408.

Upon receiving the download request 428, the first feature host 402(1) may identify an entire predefined batch of feature files to which the requested feature file belongs. For example, as illustrated, the first feature host 402(1) may determine that the requested feature file (e.g., the file named "Feature_Name2.exe") belongs to a batch of feature files named "File Batch: Feature_Name2"). Then, rather than returning merely the requested feature file, the first feature host 402(1) may return a download package 430 that includes the entire identified batch of feature files. Thus, in the illustrated example, in response to the download request 428 identifying the single file named "Feature_Name2.exe," the first feature host 402(1) returns both of the requested "Feature_Name2.exe" file and also the "Feature_Name2.dll" file—and any other feature files that are commonly batched. In some embodiments, the first feature host 402(1) may return the download package 430 in the form of a compressed archive file to increase the speed at which the entire batch of feature files becomes hydrated on the virtual machine 406.

Upon receipt of the download package 430, the virtual machine 406 may write each of the individual feature files onto the local virtual machine storage 424 (e.g., a virtual hard disk or any other suitable volatile or non-volatile virtualized storage medium) in order to convert the individual feature files from the dehydrated state into the hydrated state. In some embodiments, once the entire batch of feature files is fully hydrated (or while the batch is actively being hydrated), the virtual machine 406 services the request by provisioning access to the requested feature file by using the newly downloaded payload thereof. Alternatively, the virtual machine 406 may service the request by provisioning access to the newly downloaded payload of the requested feature file even before the payload is written to the virtual machine. For example, the request may be serviced by directly loading the payload from the download package into a memory or cache of the virtual machine 406.

Figure 5:
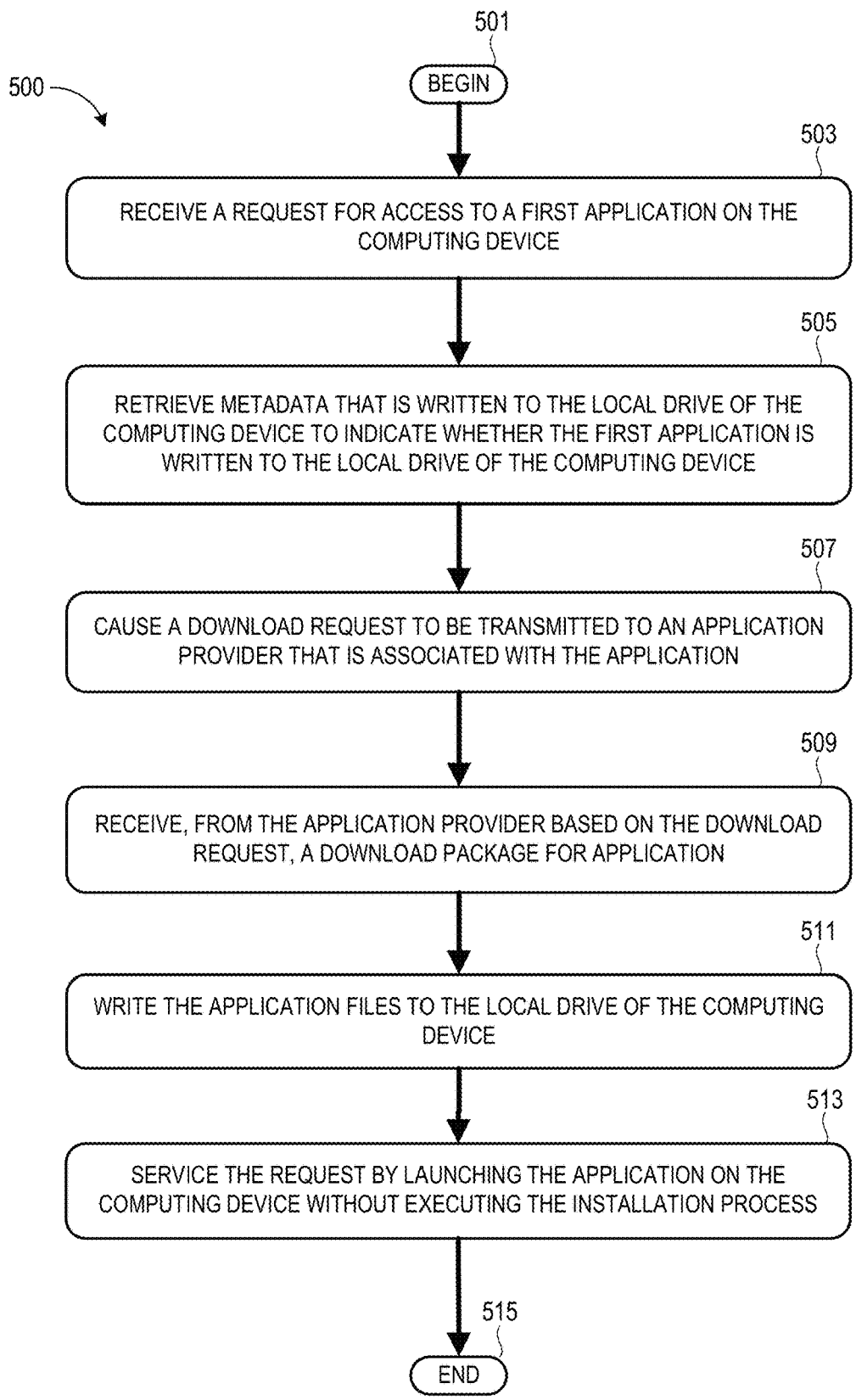
FIG. 5 is a flow diagram of an example method in accordance with the present disclosure.

FIG. 5 is a flow diagram of an example method 500 for hydrating individual application files or batches of application files onto a local drive of a computing device as called upon by a software component at the computing device. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 501, the example method 500 begins.

At block 503, a request is received for access to a first application on the computing device.

At block 505, responsive to receiving the request, metadata is retrieved that is written to the local drive of the computing device to indicate whether the first application is written to the local drive of the computing device.

At block 507, responsive to the metadata indicating that the first application is not written to the local drive of the computing device, a download request is caused to be transmitted to an application provider that is associated with the application.

At block 509, a download package is received for application from the application provider based on the download request. In an embodiment, the download package includes one or more application files that are operable to execute the application on the computing device when stored on the computing device without executing an installation process.

At block 511, based on the download package for the application files:

the application files are written to the local drive of the computing device.

At block 513, the request is serviced by launching the application on the computing device without executing the installation process.

Once the request is serviced, the example method 500 ends at block 515.

Figure 6:
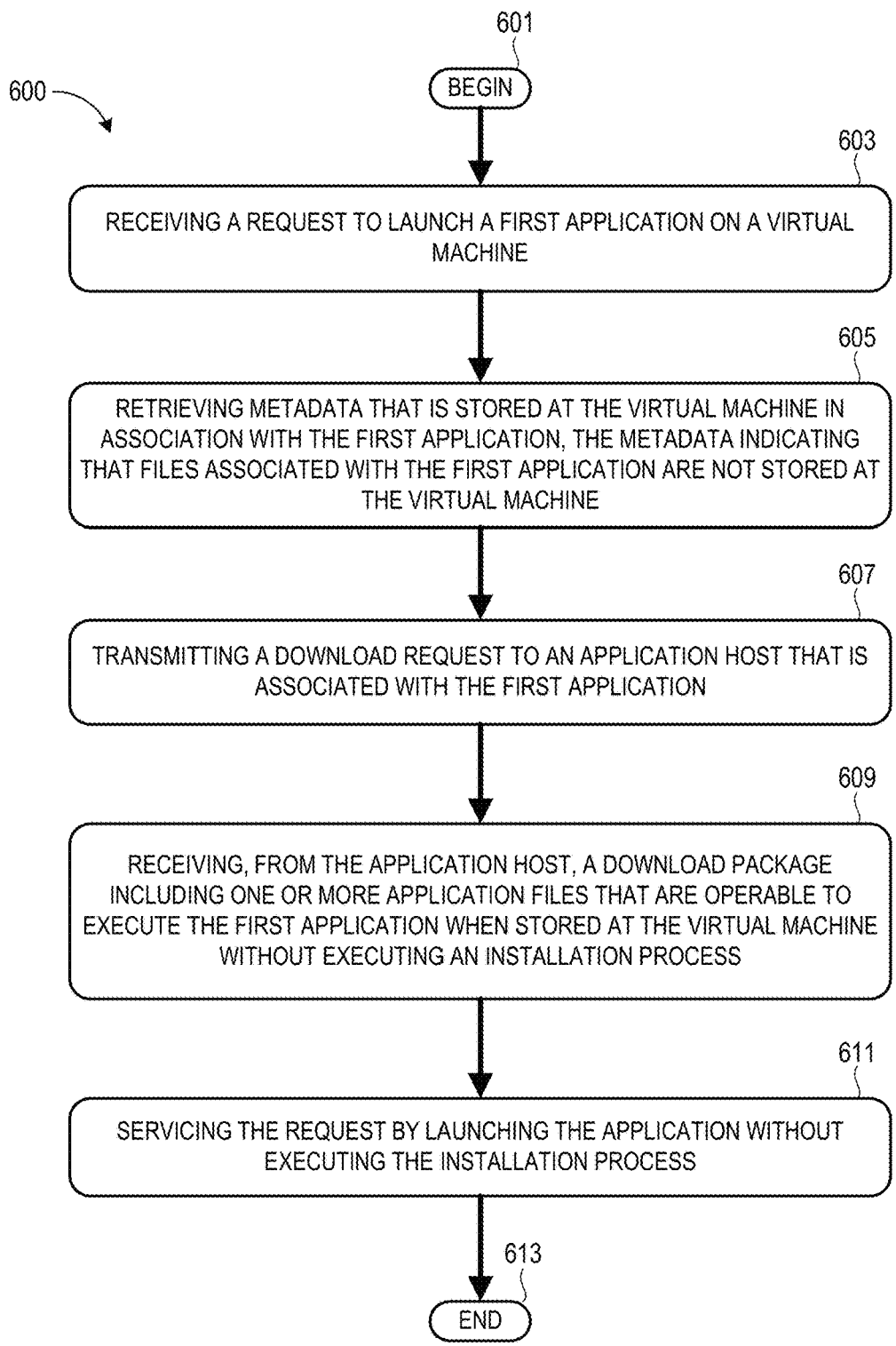
FIG. 6 is a flow diagram of an example method in accordance with the present disclosure.

FIG. 6 is a flow diagram of an example method 600 for hydrating individual application files or batches of application files onto a local drive of a computing device as called upon by a software component at the computing device. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 601, the example method 600 begins.

At block 603, a request is received to launch a first application on a virtual machine.

At block 605, responsive to the request, metadata is received that is stored at the virtual machine in association with the first application, the metadata indicating that files associated with the first application are not stored at the virtual machine.

At block 607, a download package is received from the application host including one or more application files that are operable to execute the first application when stored at the virtual machine without executing an installation process.

At block 609, based on the download package, the request is serviced by launching the application without executing the installation process.

Once the request is serviced, the example method 600 ends at block 611.

Figure 7:
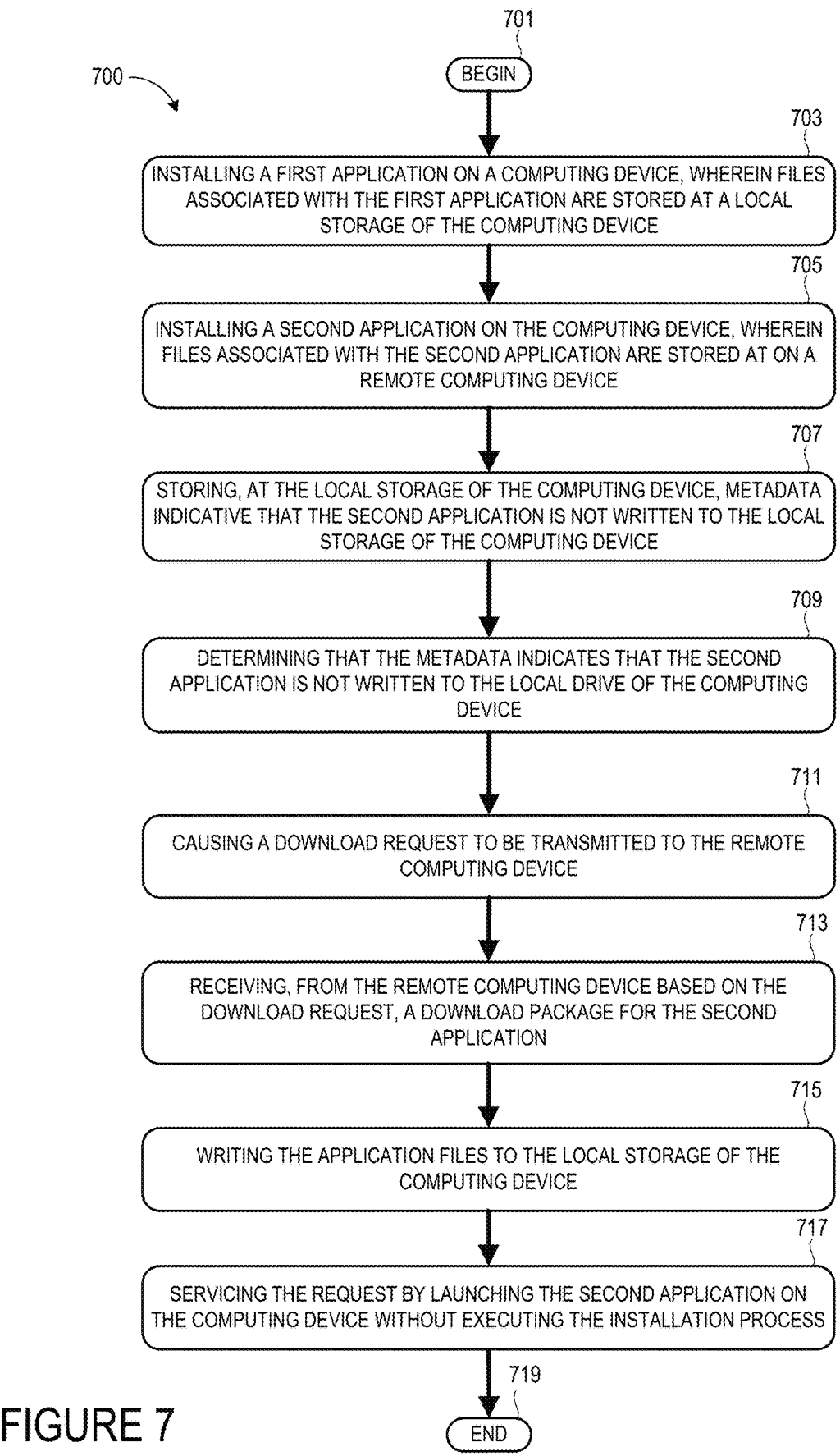
FIG. 7 is a flow diagram of an example method in accordance with the present disclosure.

FIG. 7 is a flow diagram of an example method 700 for hydrating individual application files or batches of application files onto a local drive of a computing device as called upon by a software component at the computing device. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 701, the example method 700 begins.

At block 703, a first application is installed on a computing device, wherein files associated with the first application are stored at a local storage of the computing device.

At block 705, a second application is installed on the computing device, wherein files associated with the second application are stored at on a remote computing device.

At block 707, metadata is stored at the local storage of the computing device indicative that the second application is not written to the local storage of the computing device.

At block 709, responsive to a request to launch the second application, it is determined that the metadata indicates that the second application is not written to the local drive of the computing device.

At block 711, a download request is caused to be transmitted to the remote computing device.

At block 713, a download package for the second application is received from the remote computing device based on the download request. In an embodiment, the download package includes one or more application files that are operable to execute the second application on the computing device without executing an installation process.

At block 715, based on the download package, the application files are written to the local storage of the computing device.

At block 717, the request is serviced by launching the second application on the computing device without executing the installation process.

Once the request is serviced, the example method 700 ends at block 719.

Figure 8:
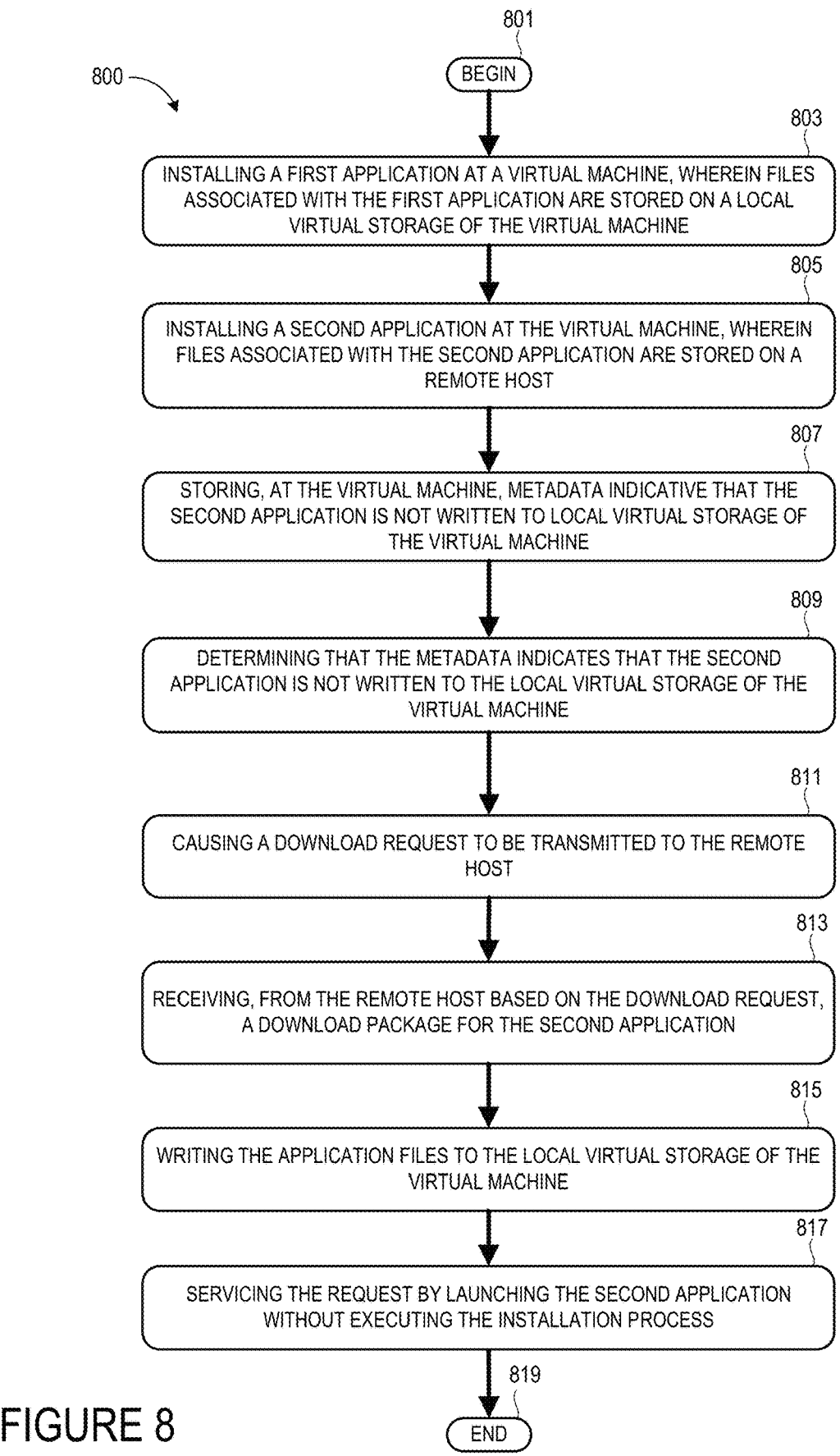
FIG. 8 is a flow diagram of an example method in accordance with the present disclosure.

FIG. 8 is a flow diagram of an example method 800 for hydrating individual application files or batches of application files onto a local drive of a computing device as called upon by a software component at the computing device. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 801, the example method 800 begins.

At block 803, a first application is installed at a virtual machine, wherein files associated with the first application are stored on a local virtual storage of the virtual machine.

At block 805, a second application is installed at the virtual machine, wherein files associated with the second application are stored on a remote host.

At block 807, metadata is stored, at the virtual machine, indicative that the second application is not written to local virtual storage of the virtual machine.

At block 809, responsive to a request to launch the second application, it is determined that the metadata indicates that the second application is not written to the local virtual storage of the virtual machine.

At block 811, a download request is caused to be transmitted to the remote host.

At block 813, a download package for the second application is received from the remote host based on the download request. In an embodiment, the download package includes one or more application files that are operable to execute the second application without executing an installation process.

At block 815, based on the download package, the application files are written to the local virtual storage of the virtual machine.

At block 817, the request is serviced by launching the second application without executing the installation process.

Once the request is serviced, the example method 800 ends at block 819.

Example Clauses

The disclosure presented herein may be considered in view of the following clauses.

1. A computing device comprising:
a local drive;
one or more processors;
a memory in communication with the one or more processors, the memory storing computer-readable instructions stored thereupon which, when executed by the one or more processors, cause the computing device to:
receive a request for access to a first application on the computing device;
responsive to receiving the request, retrieve metadata that is written to the local drive of the computing device to indicate whether the first application is written to the local drive of the computing device;
responsive to the metadata indicating that the first application is not written to the local drive of the computing device, cause a download request to be transmitted to an application provider that is associated with the application;
receive, from the application provider based on the download request, a download package for application, wherein the download package includes one or more application files that are operable to execute the application when stored on the computing device without executing an installation process; and
based on the download package for the application files:
write the application files to the local drive of the computing device; and
service the request by launching the application without executing the installation process.

2. A computer-implemented method comprising:
receiving a request to launch a first application on a virtual machine;
responsive to the request, retrieving metadata that is stored at the virtual machine in association with the first application, the metadata indicating that files associated with the first application are not stored at the virtual machine;
transmitting a download request to an application host that is associated with the first application, the download request including aspects of the metadata to identify the first application;
receiving, from the application host, a download package including one or more application files that are operable to execute the first application when stored at the virtual machine without executing an installation process; and
based on the download package, servicing the request by launching the application without executing the installation process.

3. A method comprising:
installing a first application on a computing device, wherein files associated with the first application are stored at a local storage of the computing device;
installing a second application on the computing device, wherein files associated with the second application are stored at on a remote computing device;
storing, at the local storage of the computing device, metadata indicative that the second application is not written to the local storage of the computing device;
wherein responsive to a request to launch the second application:
determining that the metadata indicates that the second application is not written to the local drive of the computing device;
causing a download request to be transmitted to the remote computing device;
receiving, from the remote computing device based on the download request, a download package for the second application, wherein the download package includes one or more application files that are operable to execute the second application without executing an installation process;
based on the download package, write the application files to the local storage of the computing device; and
service the request by launching the second application without executing the installation process.

4. A method comprising:
installing a first application at a virtual machine, wherein files associated with the first application are stored on a local virtual storage of the virtual machine;
installing a second application at the virtual machine, wherein files associated with the second application are stored on a remote host;
storing, at the virtual machine, metadata indicative that the second application is not written to local virtual storage of the virtual machine;
responsive to a request to launch the second application, determining that the metadata indicates that the second application is not written to the local virtual storage of the virtual machine;
causing a download request to be transmitted to the remote host;
receiving, from the remote host based on the download request, a download package for the second application, wherein the download package includes one or more application files that are operable to execute the second application without executing an installation process;
based on the download package, writing the application files to the local virtual storage of the virtual machine; and
servicing the request by launching the second application without executing the installation process.

In closing, although the various techniques have been described in language specific to structural applications and/or methodological acts, it is to be understood that the subject matter defined in the appended representations is not necessarily limited to the specific applications or acts described. Rather, the specific applications and acts are disclosed as example forms of implementing the claimed subject matter.

What is claimed is:
1. A computing device comprising:
a local drive;
one or more processors;
a memory in communication with the one or more processors, the memory storing computer-readable instructions stored thereupon which, when executed by the one or more processors, cause the computing device to:

receive a request for access to a first application on the computing device;

responsive to receiving the request, retrieve metadata that is written to the local drive of the computing device to indicate whether the first application is written to the local drive of the computing device;

responsive to the metadata indicating that the first application is not written to the local drive of the computing device, cause a download request to be transmitted to an application provider that is associated with the application;

receive, from the application provider based on the download request, a download package for the first application, wherein the download package includes a predefined compressed batch of files to which the first application belongs, wherein one or more files of the batch are operable to execute the application on the computing device when stored on the computing device without executing an installation process; and based on the download package for the files:
write the files to the local drive of the computing device; and
service the request by launching the application on the computing device without executing the installation process.

2. The computing device of claim 1, further comprising computer-readable instructions stored thereupon which, when executed by the one or more processors, cause the computing device to:

receive a request for access to a second application on the computing device;

responsive to receiving the second request, retrieve metadata that is written to the local drive of the computing device to indicate whether the second application is written to the local drive of the computing device; and responsive to the metadata indicating that the second application is written to the local drive of the computing device, cause installation of the second application on the computing device, wherein files associated with the second application are stored at a local storage of the computing device.

3. The computing device of claim 1, wherein the metadata includes one or more of file names, sizes, time stamps, permissions, and version.

4. The computing device of claim 1, wherein when the first application is not written to the local drive of the computing device, files associated with the first application are stored remotely from the computing device.

5. A method comprising:

installing a first application on a computing device, wherein files associated with the first application are stored at a local storage of the computing device;

installing a second application on the computing device, wherein files associated with the second application are stored at on a remote computing device;

storing, at the local storage of the computing device, metadata indicative that the second application is not written to the local storage of the computing device;

responsive to a request to launch the second application:

determining that the metadata indicates that the second application is not written to the local drive of the computing device;

causing a download request to be transmitted to the remote computing device;

receiving, from the remote computing device based on the download request, a download package for the second application, wherein the download package includes a predefined compressed batch of files to which the first application belongs, wherein one or more files of the batch are operable to execute the second application on the computing device without executing an installation process;

based on the download package, write the files to the local storage of the computing device; and service the request by launching the second application on the computing device without executing the installation process.

6. The method of claim 5, wherein when a predetermined condition is met, the files associated with the second application are removed from the computing device and stored at the remote computing device.

7. The method of claim 5, further comprising:

when a predetermined condition is met, the files associated with the second application are removed from the computing device and stored at the remote computing device, and storing, at the local storage of the computing device, metadata indicative that the first application is not written to the local storage of the computing device.

8. The method of claim 7, wherein the predetermined condition is one or more of an amount of storage that is available, and an age of installation of the second application.

9. The method of claim 5, further comprising intercepting application launches to determine if a requested application is locally stored.

10. The method of claim 5, wherein determination of which applications are stored at the local storage of the computing device is made during an initial configuration of the computing device.

11. The method of claim 5, wherein the second application is indicated as being locally available via a user interface indicative of a filing system for the computing device.

12. A system configured to launch applications, the system comprising one or more processors;

a memory in communication with the one or more processors, the memory storing computer-readable instructions stored thereupon which, when executed by the one or more processors, cause the system to:

install a first application on a computing device, wherein files associated with the first application are stored at a local storage of the computing device;

install a second application on the computing device, wherein files associated with the second application are stored at on a remote computing device;

store, at the local storage of the computing device, metadata indicative that the second application is not written to the local storage of the computing device;

responsive to a request to launch the second application:

determine that the metadata indicates that the second application is not written to the local drive of the computing device;

cause a download request to be transmitted to the remote computing device;

receive, from the remote computing device based on the download request, a download package for the second application, wherein the download package includes a predefined compressed batch of files to which the second application belongs, wherein one or more files of the batch are operable to execute the second application on the computing device without executing an installation process;

based on the download package, write the files to the local storage of the computing device; and service the request by launching the second application on the computing device without executing the installation process.

13. The system of claim 12, wherein when a predetermined condition is met, the files associated with the second application are removed from the computing device and stored at the remote computing device.

14. The system of claim 12, further comprising:

when a predetermined condition is met, the files associated with the second application are removed from the computing device and stored at the remote computing device, and storing, at the local storage of the computing device, metadata indicative that the first application is not written to the local storage of the computing device.

15. The system of claim 14, wherein the predetermined condition is an amount of storage that is available on the system.

16. The system of claim 14, wherein the predetermined condition is an age of installation of the second application.

17. The system of claim 12, further comprising intercepting application launches to determine if a requested application is locally stored.

18. The system of claim 12, wherein determination of which applications are stored at the local storage of the computing device is made during an initial configuration of the computing device.

19. The system of claim 12, wherein the second application is indicated as being locally available via a user interface indicative of a filing system for the computing device.

20. The system of claim 12, wherein the metadata includes one or more of file names, sizes, time stamps, permissions, and version.

* * * * *